United States Patent [19]

Kamiya

[11] Patent Number: 5,465,205
[45] Date of Patent: Nov. 7, 1995

[54] AUTOMATIC GAIN CONTROL APPARATUS

[75] Inventor: Ryo Kamiya, Hamamatsu, Japan

[73] Assignee: Yamaha Corporation, Hamamatsu, Japan

[21] Appl. No.: 985,036

[22] Filed: Dec. 3, 1992

[30] Foreign Application Priority Data

Dec. 9, 1991 [JP] Japan .................... 3-350350

[51] Int. Cl.⁶ .................................. G05B 13/02
[52] U.S. Cl. ........................... 364/157; 375/345
[58] Field of Search ............ 364/157; 360/77.05; 307/493, 264; 318/685, 696; 375/1; 380/34; 330/279, 281, 254; 123/696; 73/23.32; 323/280; 367/67; 358/21 R, 27, 228, 211

[56] References Cited

U.S. PATENT DOCUMENTS

| | | | |
|---|---|---|---|
| 4,278,060 | 7/1981 | Isobe et al. | 123/696 |
| 4,334,185 | 6/1982 | Turney et al. | 323/280 |
| 4,646,275 | 2/1987 | Smith | 367/67 |
| 4,989,074 | 1/1991 | Matsumoto | 358/21 R |
| 5,053,877 | 10/1991 | Kondo et al. | 358/228 |
| 5,107,225 | 4/1992 | Wheatley, III et al. | 330/279 |
| 5,134,631 | 7/1992 | Kingston et al. | 375/1 |
| 5,216,345 | 6/1993 | Eyerly | 318/685 |
| 5,220,468 | 6/1993 | Sidman | 360/77.05 |

*Primary Examiner*—James P. Trammell
*Attorney, Agent, or Firm*—Spensley Horn Jubas & Lubitz

[57] ABSTRACT

The automatic gain controller is comprised of a multiplier for multiplying an input signal by a given AGC multiplication factor to produce an output signal. An adder is provided for subtracting a target value from the output signal and adding an integrated value of an error value from the adder to the output signal to produce error value. An integrator to compute the integrated value of the error value from the adder. An operator is provided for computing a compensation value based on the error value according to a predetermined polynomial. An accumulator is provided for producing said AGC multiplication factor according to the compensation value. The automatic gain controller is composed of a digital signal processor specifically programmed to functionally constitute those of the multiplier, the adder, the operator, and the accumulator.

8 Claims, 10 Drawing Sheets

AUTOMATIC GAIN CONTROL APPARATUS

BACKGROUND OF THE INVENTION

The present invention relates to an automatic gain control apparatus and a method of automatically regulating an input gain by means of a digital signal processor (hereinafter, referred to as "DSP").

The automatic gain control (hereinafter, referred to as "AGC") is adopted in various fields such as audio instruments for maintaining constantly a level of an output signal while a level of an input signal fluctuates. The conventional AGC apparatus utilizes a feedback loop operative such as to detect an error between the input signal level and a given target value and to vary an attenuation factor of a volume controller or to vary a gain of a variable amplifier in order to reduce the detected error to thereby maintain the output signal level at the target value.

FIG. 10 is a block diagram showing an example of the conventional AGC apparatus. In the figure, the conventional apparatus is comprised of a volume controller 1 having an analog circuit construction, which processes an analog input signal to suppress a level fluctuation thereof to thereby produce an output signal having a constant level. The output signal of the volume controller 1 is partly circulated to a feedback loop through a rectifier 2 which effects full-wave rectification so that the signal is converted from a voltage form into an energy form. In case that the rectifier 2 and subsequent circuits are composed of a digital structure, an A/D converter may be provided at a preceding stage of the rectifier 2 such that a digitalized signal may be fed to the digital rectifier 2. In this case, the rectifier 2 operates to discriminate a polarity of the inputted digital signal so as to invert a negative portion of the signal while passing a positive portion as it is, thereby outputting the digitally rectified signal.

A pair of counters 3A, 3B of different operation modes are provided to count the rectified digital signal independently from each other. These counters 3A, 3B function as an integrator operative to count an input value in terms of the input energy while sequentially subtracting a given constant target value in terms of a target energy from the input value to thereby accumulate a subtracted value every given sample timing for a predetermined period. In this case, for example, the same accumulation period is set for each of the counters 3A and 3B, while a relatively longer or slower sample timing is set in the counter 3A and a relatively shorter or faster sample timing is set in the other counter 3B. Thus, the slow counter 3A having a relatively small accumulation cycle number is utilized to detect a relatively great scale of the error as compared to the other fast counter 3B having a relatively great accumulation cycle number in the same accumulation period.

FIG. 11 is a graph of a typical characteristic curve showing the relation between the error value and a compensation value. The fast counter 3B covers a limited region C3 to detect a small scale of the error. In the illustrated case, the compensation value is set to zero in the limited region C3. On the other hand, the slow counter 3A covers extended regions C2, C4 to detect a great scale of the error, and the compensation value increases according to the error value.

Referring back to FIG. 10, a pair of window comparators 4A and 4B are connected to the counters 3A and 3B, respectively, to judge as to where the counted value of these counters 3A and 3B falls among the five regions C1–C5 shown in FIG. 11. A compensation coefficient selector 5 is provided to operate according to the judgment of the window comparators 4A, 4B for selectively outputting one of five compensation coefficients including the zero compensation coefficient. An accumulator 6 receives an inverted one of the selected compensation coefficient so as to control the attenuation factor of the volume controller 1.

The above mentioned conventional AGC apparatus has the following drawbacks:
(1) When the AGC is tuned to closely and finely regulate the input signal around a given target energy value, the AGC may suffer from reduction in response speed, thereby failing to follow an overall level shift.
(2) In turn, when the AGC is tuned to quickly follow the overall level shift, an input volume value may oscillate adversely around the target energy value.
(3) In order to vary the compensation coefficient more finely in response to a deviation of the input signal from the target energy value, additional hardware components are required for detecting varying points and for adjusting parameters.
(4) Since the conventional circuit has a hard logic construction, it might be difficult to change parameters.
(5) Many hardware components are required for constructing an efficient AGC apparatus.

SUMMARY OF THE INVENTION

An object of the present invention is to provide an improved automatic gain control technology in which an input gain control is conducted by DSP program to thereby eliminate hardware components for regulation, to facilitate change of parameters, to ensure stable operation at a given target energy level, to realize quick response to an overall input level shift, and to achieve fast processing speed. In order to realize the above object, the inventive AGC apparatus is comprised of multiplier means for multiplying an input signal by a certain AGC multiplication factor to produce an output signal, adder means for subtracting a given target value from the output signal and adding an integrated value of an error value from the adder means to the output signal to compute the error value, integrator means for computing the integrated value of the error value from the adder means, operator means for calculating a compensation value based on the error value with using a given polynomial, and accumulator means for producing the AGC multiplication factor according to the compensation value. The AGC apparatus is composed of a digital signal processor operated systematically according to a given program so as to constitute the above listed multiplier means, adder means, operator means, and accumulator means.

The inventive automatic gain control method utilizes a digital signal processor operated systematically according to a specific program to effect automatic gain control of an input signal to stabilize an output signal at a predetermined target value. The method is executed sequentially by first step of operating the digital signal processor to multiply the input signal by a given AGC multiplication factor to produce the output signal, second step of operating the digital signal processor to subtract the target value from an integrated value of the output signal to produce an error value, third step of operating the digital signal processor to compute a compensation value based on the error value according to a predetermined polynomial, and fourth step of operating the digital signal processor to accumulate the compensation value to produce said AGC multiplication factor.

According to the invention, the AGC is effected by the

DSP program to carry out the input gain regulation. As well known, the DSP is comprised of a data memory, a multiplication unit, an adding unit, an accumulating unit, a selector and so on. The DSP can achieve fast processing such that the adding unit and the multiplication unit cooperate with each other in parallel manner to execute arithmetical operation between an eternally inputted data and an internal data stored in the data memory. The DSP is suitably and specifically programmed to realize an ideal error compensation characteristic curve effective to compensate for an error between the input signal and the target value, without necessitating additional hardware components and with faster processing speed. On the other hand, the conventional structure cannot realize the ideal error compensation characteristic even if a vast amount of hardware components are added to the conventional structure. Moreover, the hardware construction must be rearranged in order to change operational parameters. In turn, the inventive apparatus facilitates change of the parameters, and does not necessitate an extra hardware element for adjustment.

DETAILED DESCRIPTION OF EMBODIMENTS

Figure 1:
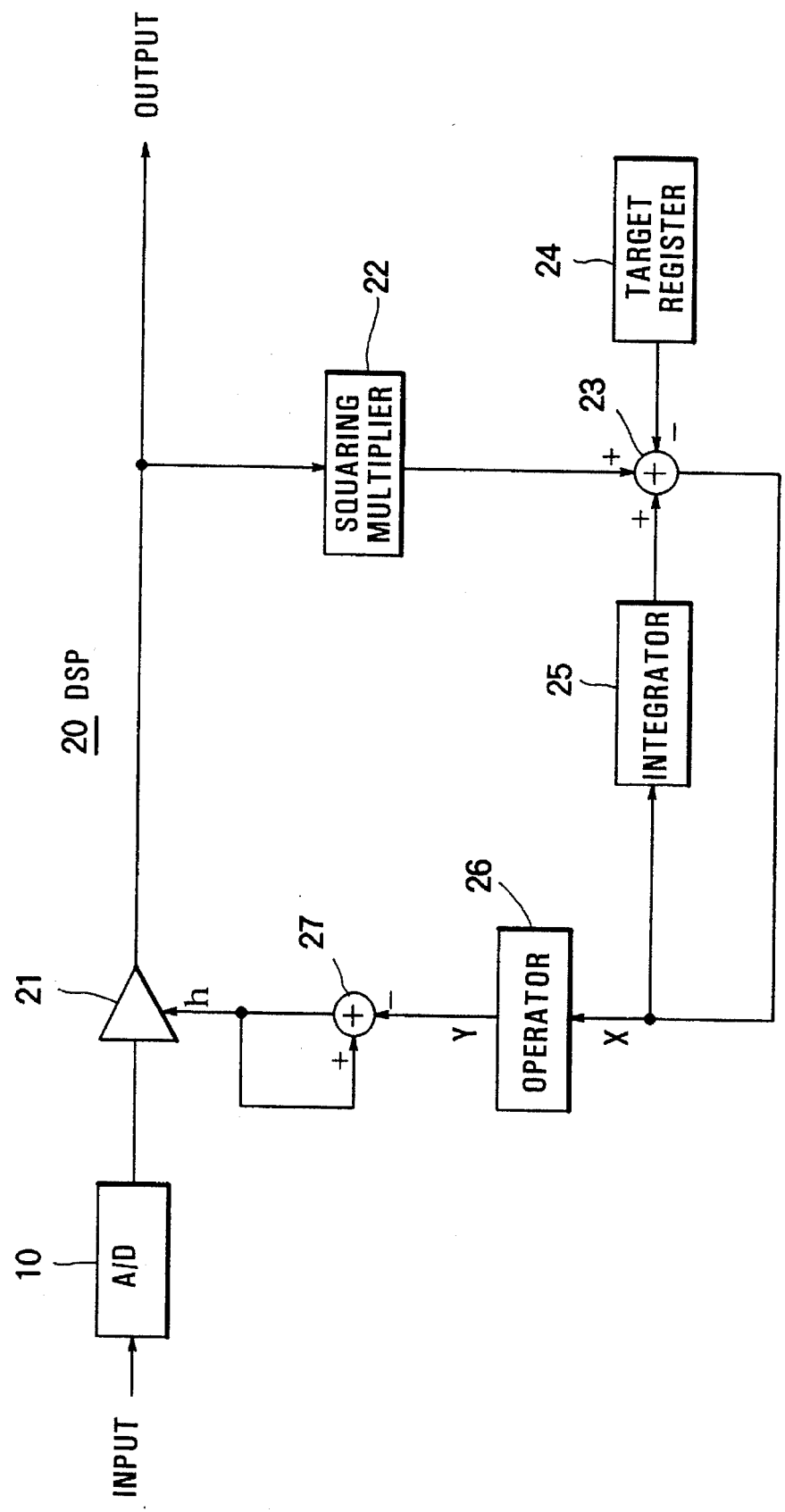
FIG. 1 is a block diagram showing a basic structure of the inventive AGC apparatus.

Hereinafter, preferred embodiments of the invention will be described in detail with reference to the drawings. Referring to FIG. 1 which shows a basic structure of the invention, the AGC apparatus is comprised of an A/D converter 10 for converting an analog input signal into a corresponding digital value, and a DSP 20 for effecting automatic gain control. The A/D converter 10 may be eliminated in case that a digital signal is directly inputted. A D/A converter may be added at an output stage in order to produce an analog output signal.

The DSP 20 is programmed to functionally provide a multiplier 21 which functions as an input volume controller, a squaring multiplier 22 for squaring an output voltage from the multiplier 21 to transform the same into an energy value. The DSP 20 further provides a combination of an adder 23, a target register 24 for storing a target energy value and an integrator 25, those of which cooperate with each other such that the adder 23 subtracts the target energy value from the input energy value while adding an output from the integrator 25 so as to produce an error value X, and the integrator 25 integrates or accumulates an output from the adder 23. An operator 26 is connected to the adder 23 for calculating a compensation value Y effective to compensate for the error value X. An accumulator 27 is interposed between the operator 26 and the multiplier 21 for converting the compensation value Y into an AGC multiplication factor h of the multiplier 21.

Figure 2:
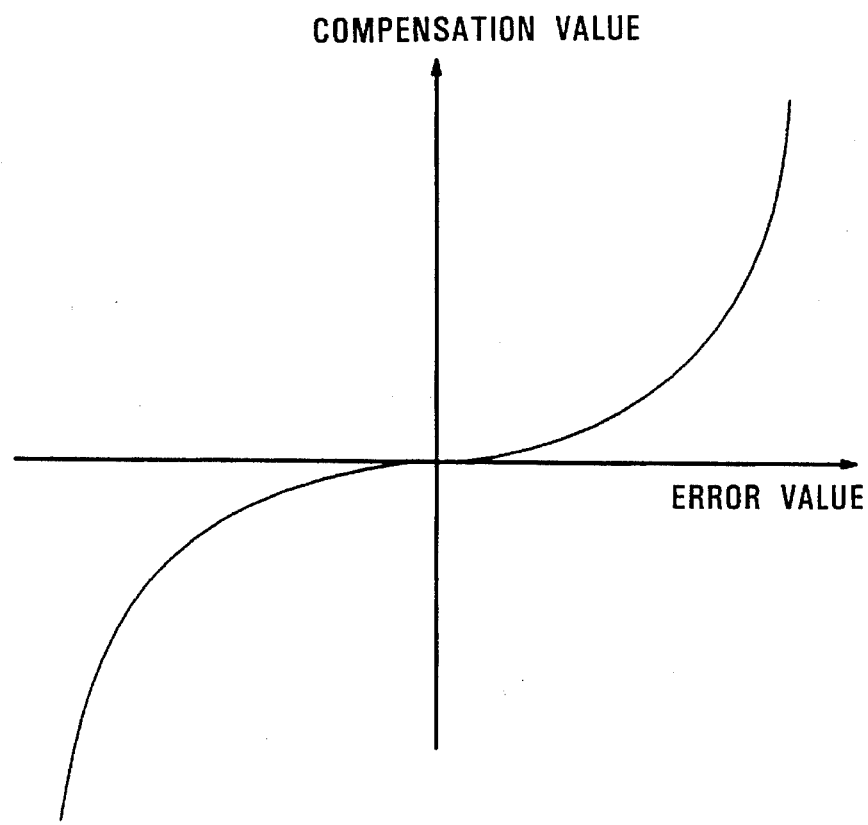
FIG. 2 is a graph showing an error compensation characteristic realized by the inventive AGC apparatus.
Figure 11:
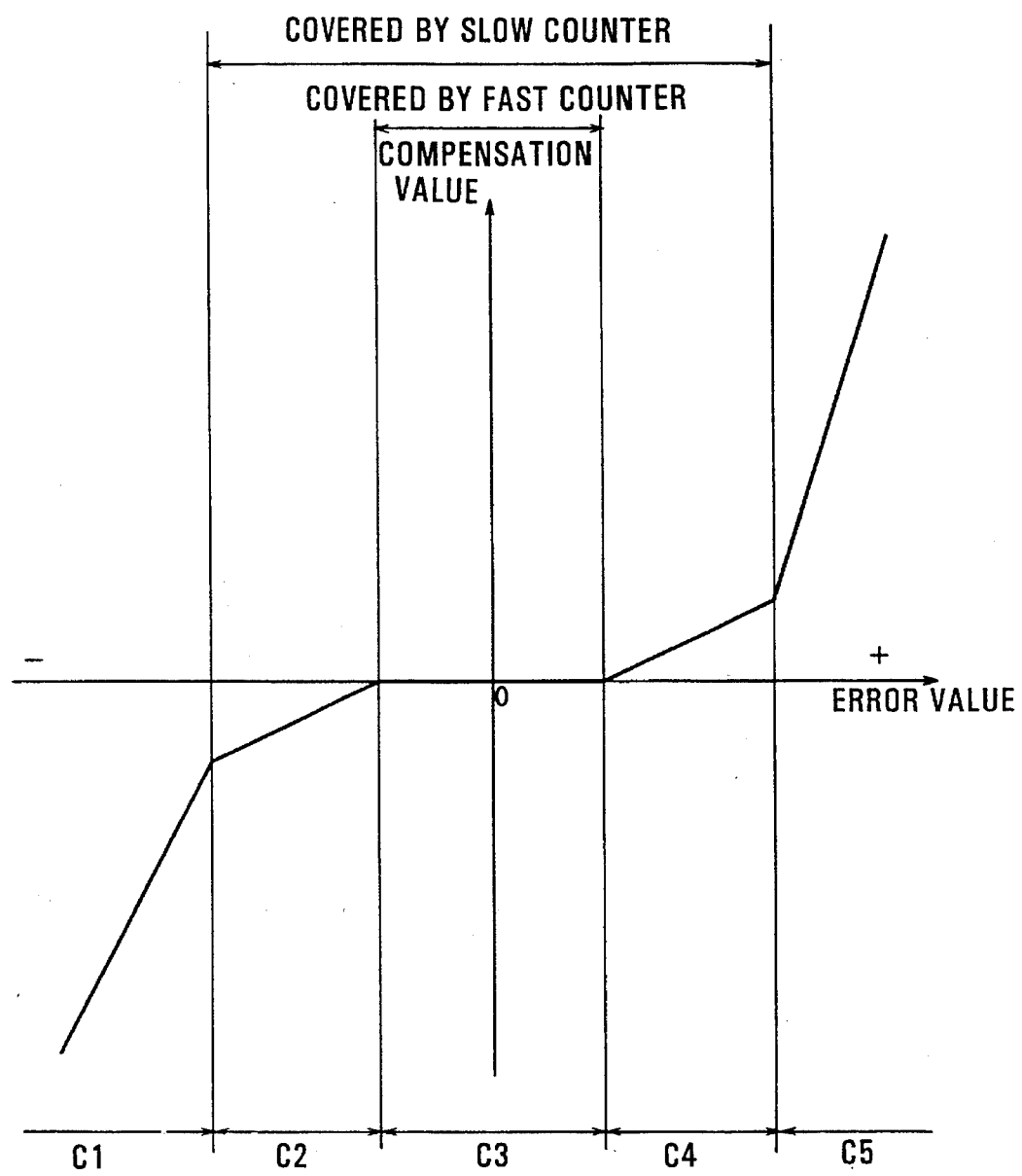
FIG. 11 is a graph showing an error compensation characteristic of the conventional AGC apparatus.

Generally, an ideal AGC characteristic should be set such that a feedback amount remains relatively small in the vicinity of the target value and it increases as the input value deviates away from the target value. The conventional error compensation characteristic shown in FIG. 11 is designed approximately after the ideal characteristic, but in fact the obtained characteristic curve is not so smooth due to deficiency of hardware capacity. On the other hand, the inventive AGC apparatus can realize the ideal error compensation characteristic curve as shown in FIG. 2 by arithmetic operation through the DSP program. For example, the operator 26 calculates the compensation value Y based on the error value X by the following polynomial:

$$Y = a_0 + a_1 X + a_2 X^2 + \cdots + a_n X^n$$

where $a_0, a_1, a_2, \ldots, a_n$ denote given coefficients. The above polynomial calculation is executed simply by arithmetic operation of multiplication and addition. The DSP can carry out internally the multiplication and the addition in parallel manner.

Figure 3:
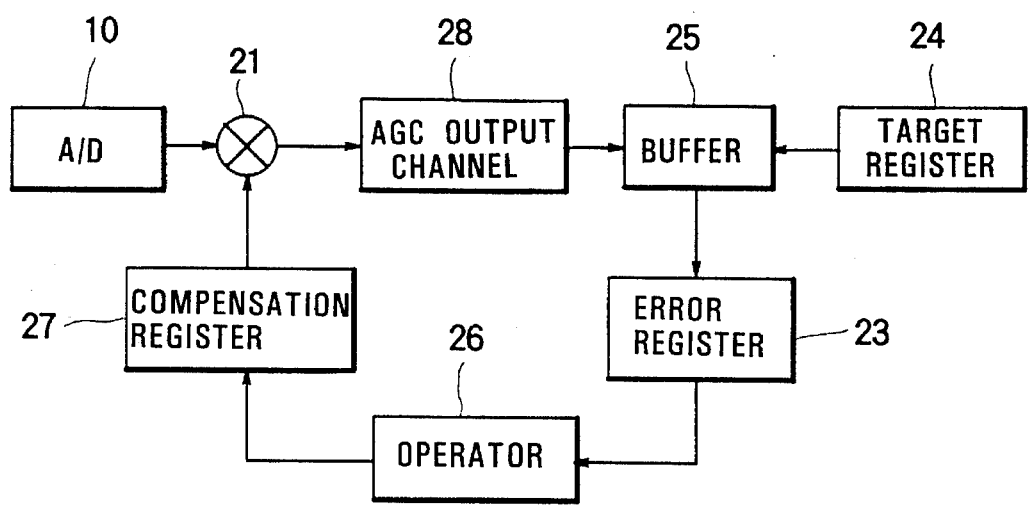
FIG. 3 is a block diagram showing another basic structure of the inventive AGC apparatus.

FIG. 3 shows a simplified embodiment of the invention. Namely, a multiplier 21 processes an input signal from an A/D converter 10 to produce an AGC output through an AGC output channel 28. The AGC output is accumulated by a buffer 25. In this stage, a target value fed from a target register 24 is subtracted to produce an error value which is loaded into an error register 23. An operator 26 carries out the above described arithmetic operation of the polynomial based on the error value to produce a compensation coefficient which is loaded into a compensation register 27 for effecting the gain regulation by the multiplier 21.

Figure 4:
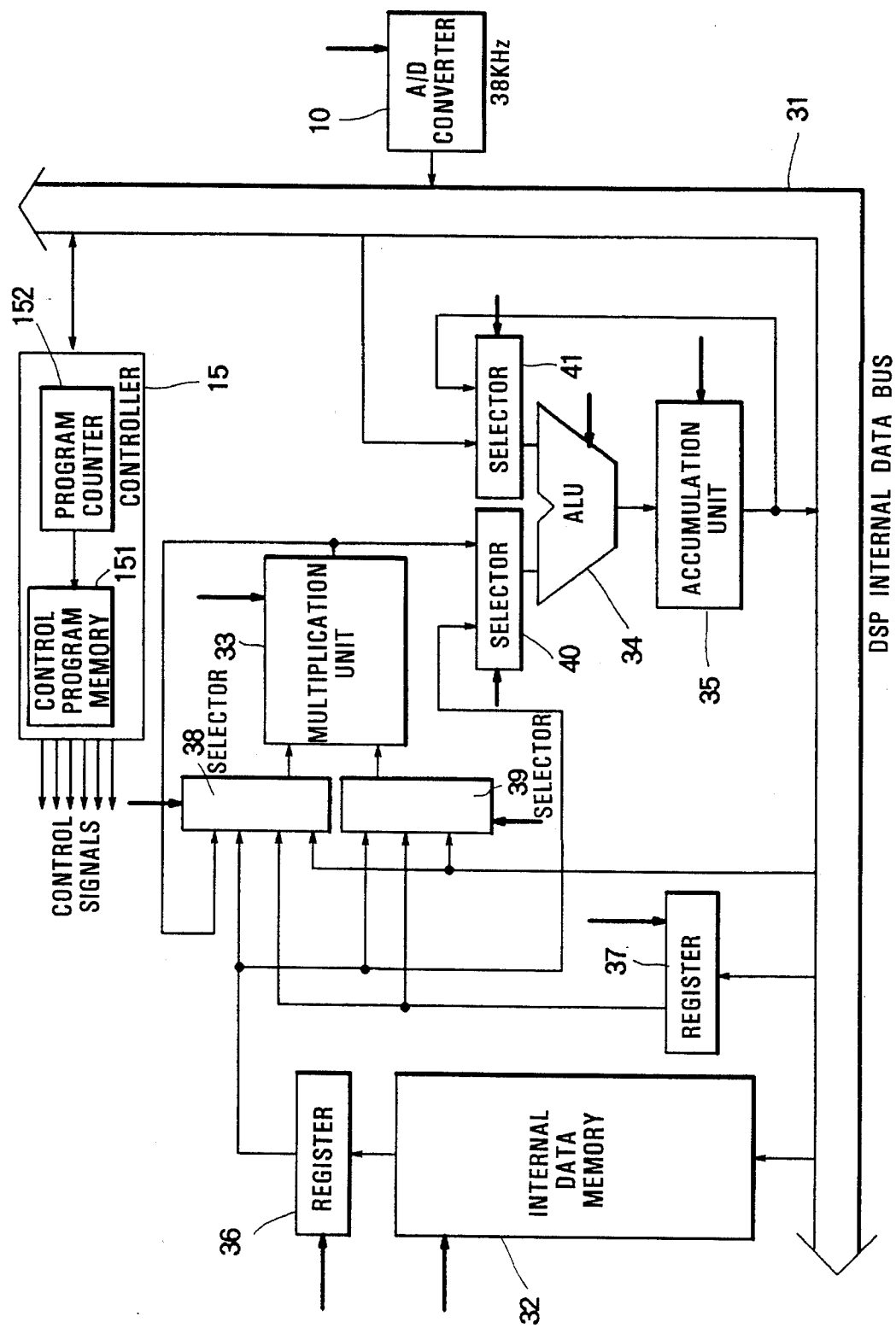
FIG. 4 is a structural diagram of a DSP utilized in one embodiment of the invention.

FIG. 4 shows a typical hardware construction of the DSP 20 utilized in the FIG. 1 embodiment. The DSP is composed of an internal data bus 31 to which is supplied an input digital signal prepared by an A/D converter 10 operated at 38 kHz of sampling frequency. An internal data memory 32 is provided to store the input digital signal and other internally processed data. The DSP further includes a multiplication unit 33 which is commonly utilized for various multiplication operations such as the input volume control, the voltage/energy conversion, and the compensation value calculation, an adding unit 34 in the form of an arithmetic-logic unit (ALU) utilized commonly for various addition operations such as the error computation and the compensation value calculation, an accumulation unit 35 for accumulating various addition results, an output register 36 connected to the memory 32, another register 37 for registering a data from the bus 31, a pair of input selectors 38, 39 connected to the multiplication unit 33, and another pair of selectors 40, 41 connected to the ALU 34.

A controller 15 (ex. a CPU) is connected to units or elements of the DSP 20 and provides the elements in the DSP 20 with control signals. The control signals are provided for controlling gates of the elements in the DSP 20. In the controller 15, a control program memory 151 stores control program commands. The controller 15 outputs control signals to the elements based upon the command outputted from the control program memory 151 according to addresses supplied from a program counter 152.

Figure 5:
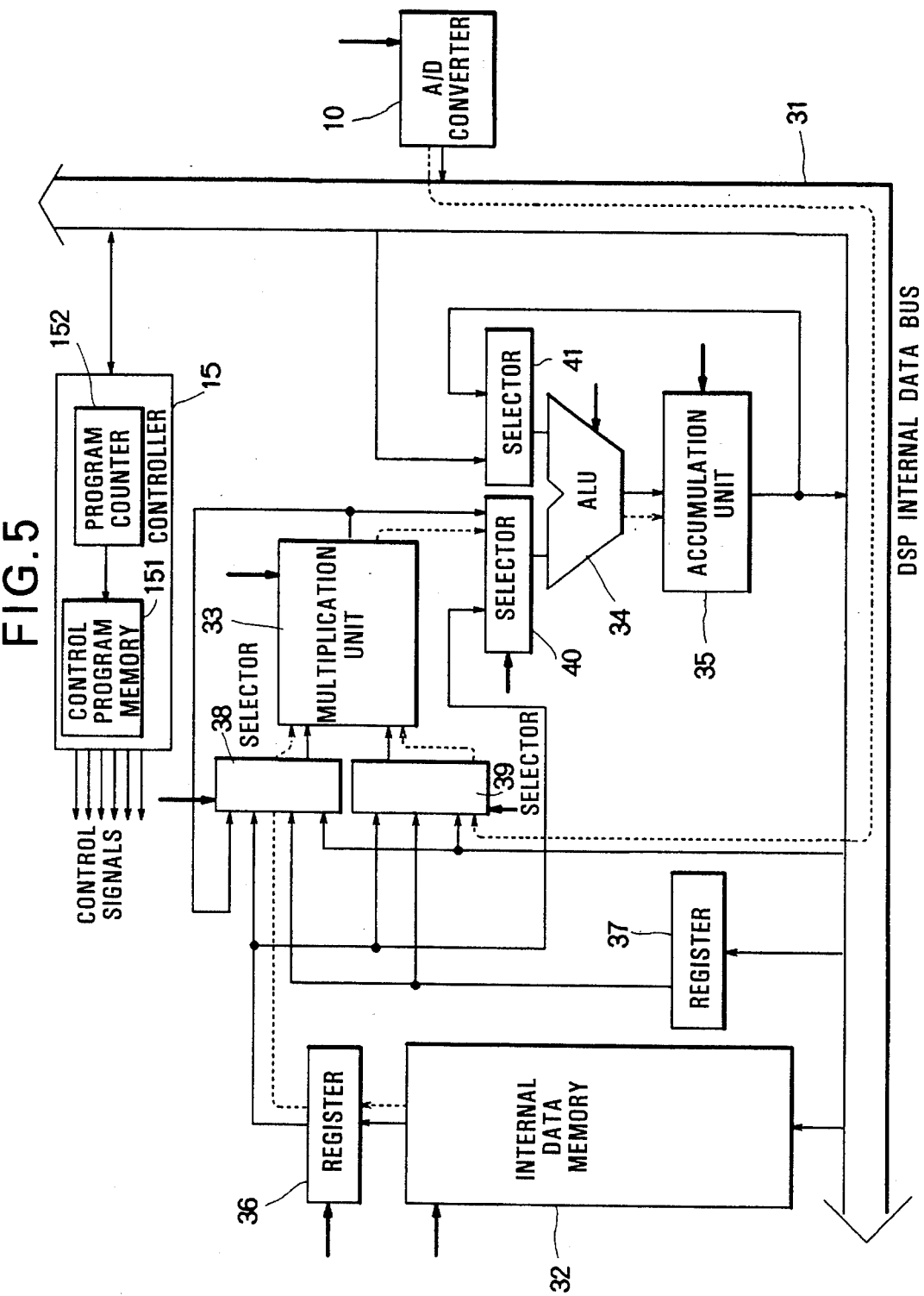
FIG. 5 is a first operational diagram of the DSP showing AGC multiplication process.

Hereinafter, the operation of the FIG. 4 DSP will be described in conjunction with data flow diagrams of FIGS. 5–9. Firstly, FIG. 5 shows an internal data flow as indicated by the dashed line in case that the DSP is programmed to functionally realize the multiplier 21 of the FIG. 1 embodiment. The control signals to open the gates of the elements in the DSP 20 are supplied, as indicated by the black arrows, to the A/D converter 10, the internal data memory 32, the multiplication unit 33, the ALU 34, the accumulation unit 35 and the register 36. Also, the control signals are supplied to the selectors 38, 39 and 40 to select a signal line from the register 36, the internal data bus 31 and the multiplication unit 33, respectively. Therefore, a present input data sampled currently by the A/D converter 10 is fed to the multiplication unit 33 through the internal data bus 31 and the selector 39, while AGC multiplication factor h calculated by the last AGC operation is retrieved from the data memory 32 and is then fed to the same multiplication unit 33 through the register 36 and the selector 38. Thus, the multiplication unit 33 produces an output data after the gain regulation. This output data is inputted into the accumulation unit 35 through the selector 40 and the ALU 34.

Figure 6:
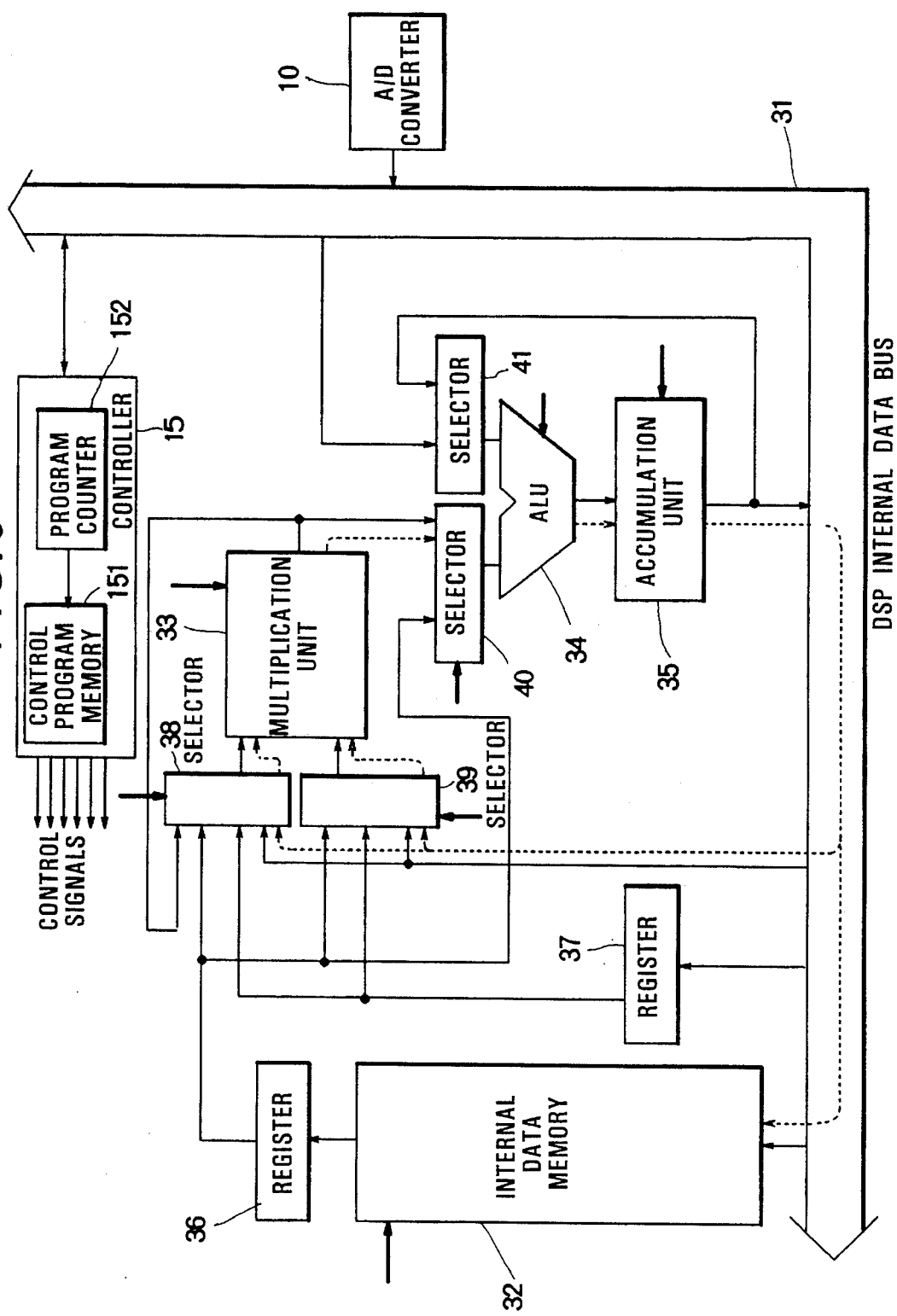
FIG. 6 is a second operational diagram of the DSP showing AGC square operation of an input signal.

FIG. 6 shows an internal data flow in case that the DSP is programmed to functionally realize the squaring operation by the squaring multiplier 22 of the FIG. 1 embodiment. The control signals to open the gates of the elements in the DSP 20 are supplied to the internal data memory 32, the multiplication unit 33, the ALU 34 and the accumulation unit 35. Also, the control signals are supplied to the selectors 38, 39 and 40 to select signal lines from the internal data bus 31 and the multiplication unit 33, respectively. Therefore, the data after the AGC regulation reserved in the accumulation unit 35 is concurrently and duplicately retrieved through the pair of selectors 38, 39 into the multiplication unit 33 to effect the squaring operation. The squared result is saved in the data memory 32 through the selector 40, the ALU 34, the accumulating unit 35 and the data bus 31.

Figure 7:
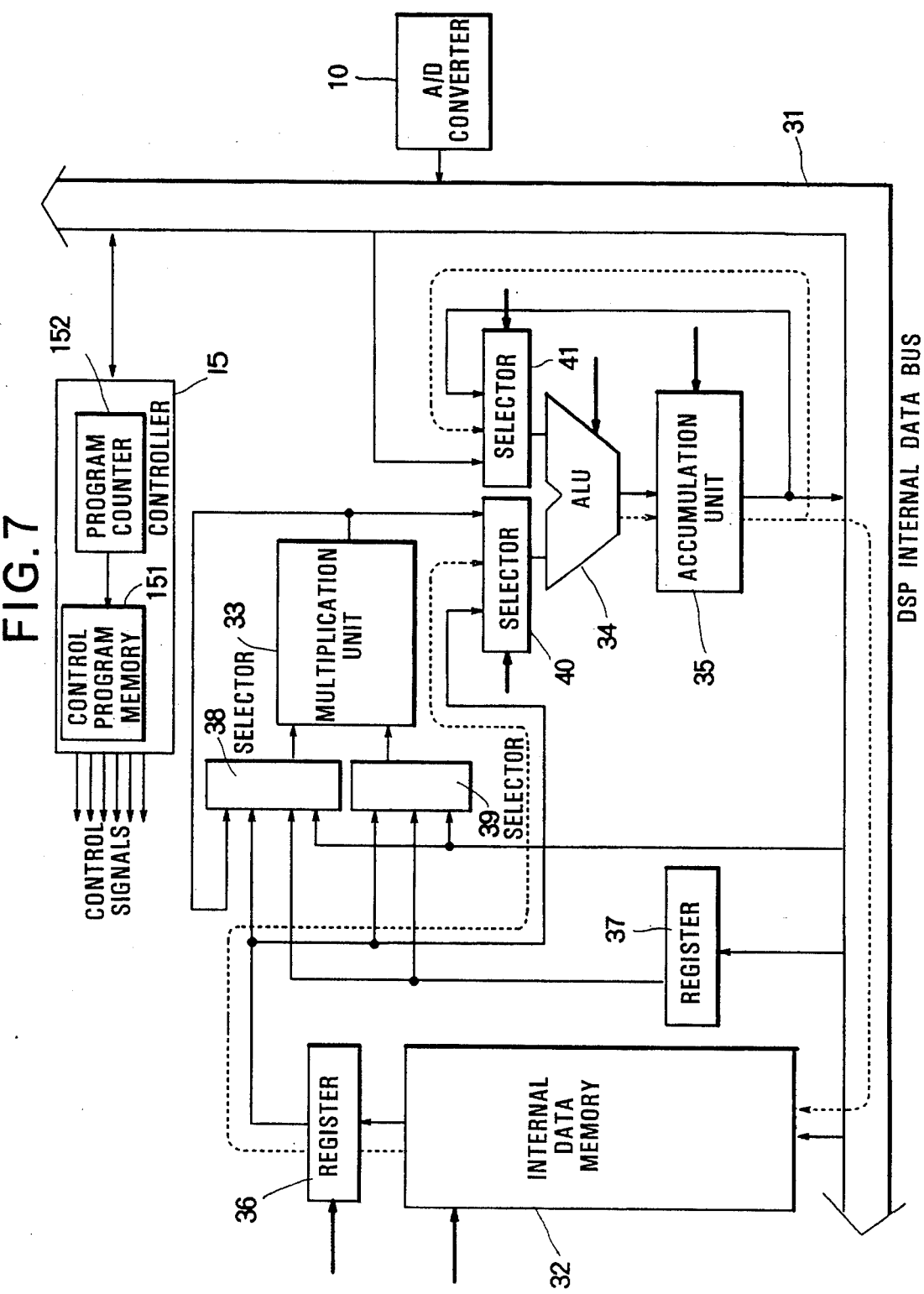
FIG. 7 is a third operational diagram of the DSP showing AGC sequential process of target value subtraction, integrative addition and integrated value update.

FIG. 7 shows an internal data flow in case that the DSP is programmed to functionally achieve, in the FIG. 1 embodiment, the addition of the integrated value by the adder 23, the subtraction of the target value by the same adder 23, and the updating of the integrated value by the integrator 25. The control signals to open the gates of the elements in the DSP 20 are supplied to the internal data memory 32, the ALU 34, the accumulation unit 35 and the register 36. Also, the control signals are supplied to the selectors 40 and 41 to select signal lines from the register 36 and the accumulation unit 35, respectively. Therefore, the addition of the integrated value is effected such that the output of the accumulation unit 35 is fed to the ALU 34 through the selector 41, while the data saved in the memory 32 is fed to the accumulation unit 35 through the register 36 and the selector 40. At the same time, the subtraction of the target value is effected simultaneously. Further, the updating of the integrated value is effected by data circulation through the accumulation unit 35.

Figure 8:
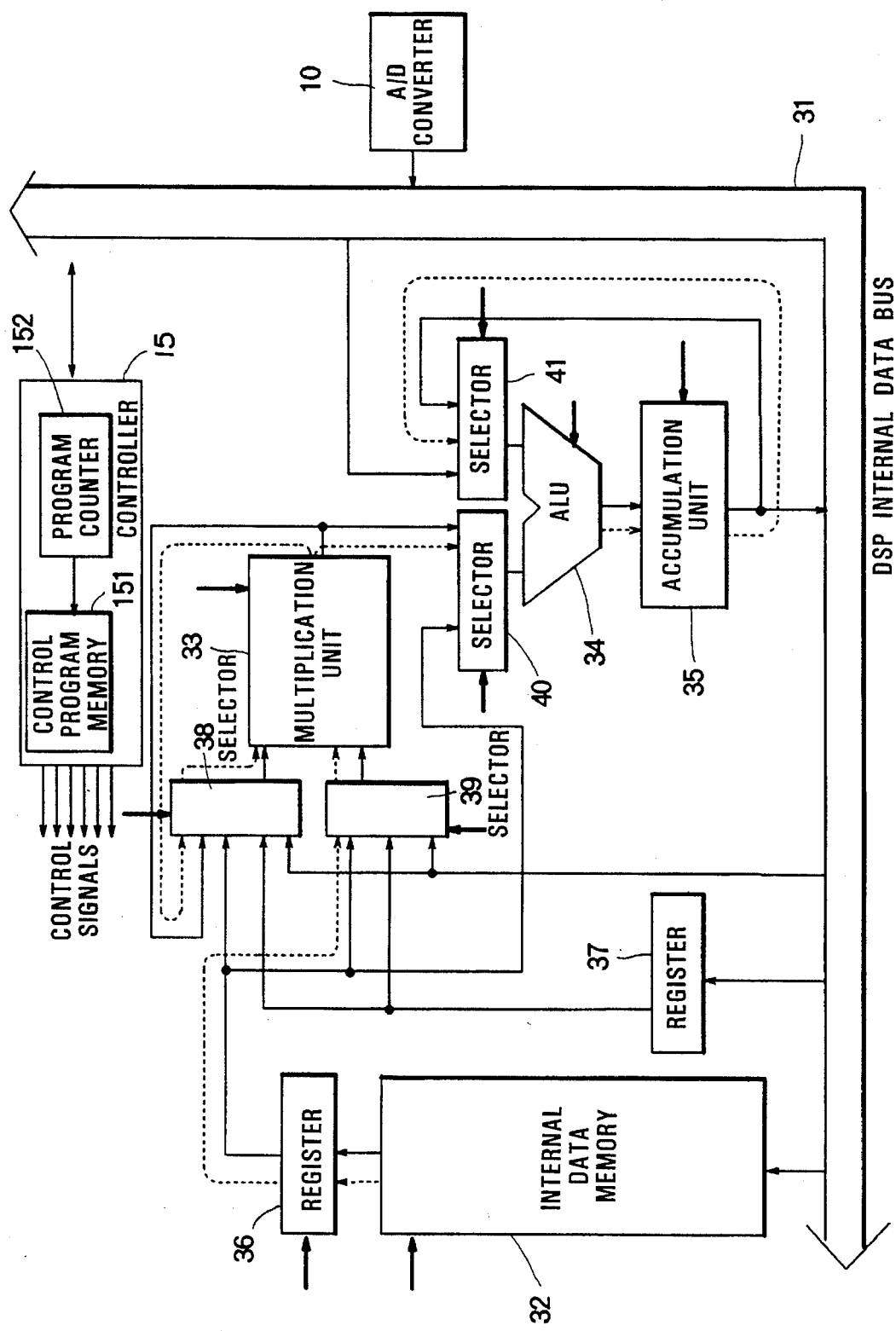
FIG. 8 is a fourth operational diagram of the DSP showing AGC polynomial process.

FIG. 8 shows an internal data flow in case that the DSP is programmed to realize the polynomial calculation by the operator 26 of the FIG. 1 embodiment. The control signals to open the gates of the elements in the DSP 20 are supplied to the internal data memory 32, the multiplication unit 33, the ALU 34, the accumulation unit 35 and the register 36. The control signals are supplied to the selectors 38 and 40 to select signal lines from the multiplication unit 33. Also, the control signals are supplied to the selectors 39 and 41 to select signal lines from the registers 36 and the accumulation unit 35, respectively. Therefore, the error value X read from the data memory 32 is fed to the multiplication unit 33 through the register 36 and the selector 39, and then the output of the multiplication unit 33 is fed back as an input thereof to carry out multiplication. The output of the multiplication unit 33 is also inputted into the ALU 34 through the selector 40. At this stage, the output of the accumulation unit 35 is inputted into the ALU 34 through the other selector 41 to effect adding operation. The added results represent the compensation value Y. The multiplication operation may be executed, for example, twenty steps to thereby obtain a substantially ideal error compensation characteristic as shown in FIG. 2.

Figure 9:
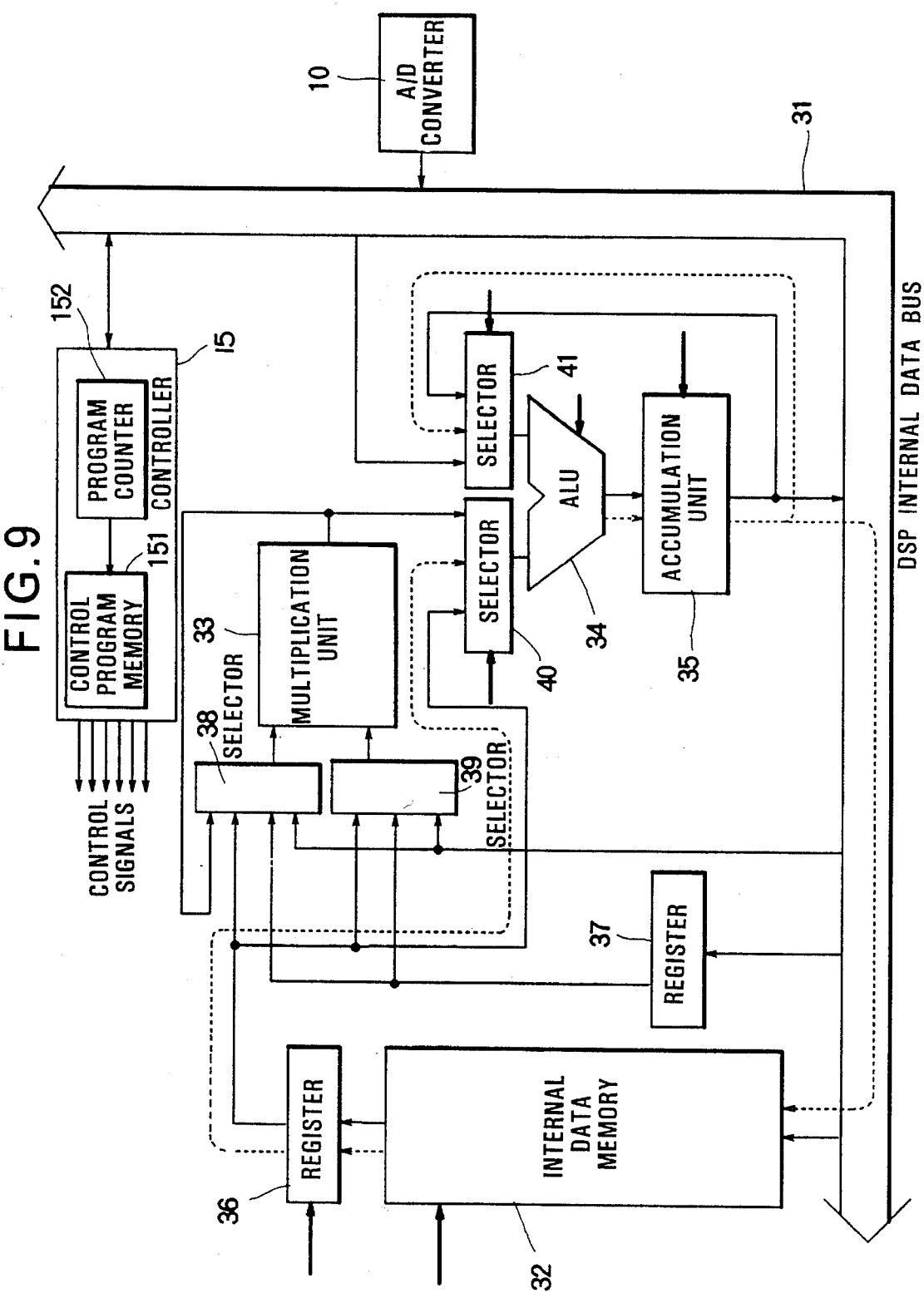
FIG. 9 is a fifth operational diagram of the DSP showing AGC updating process of an AGC multiplication factor.
Figure 10:
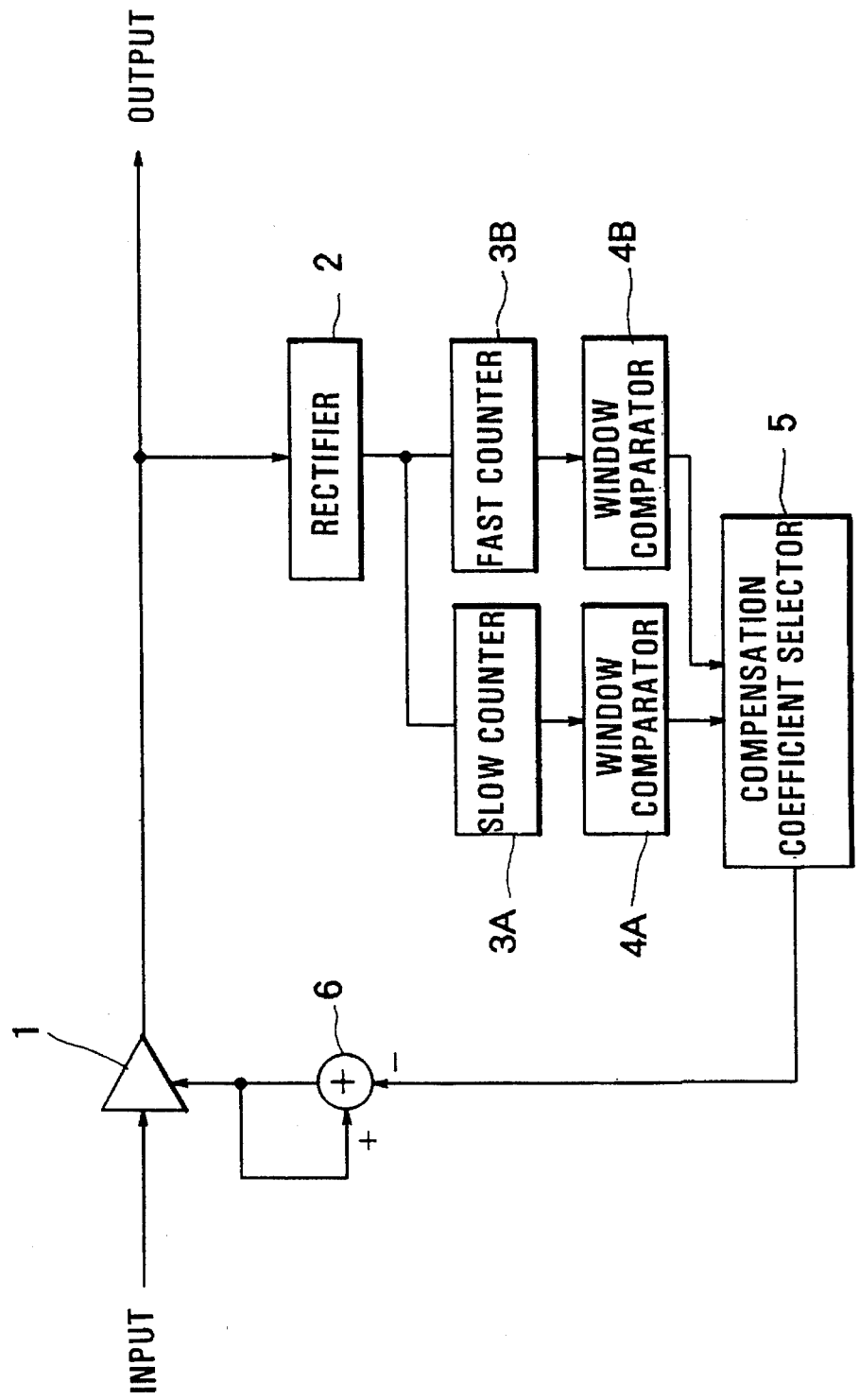
FIG. 10 is a block diagram showing a conventional AGC apparatus.

FIG. 9 shows an internal data flow in case that the DSP is programmed to functionally realize the computation of the AGC multiplication factor h by the accumulator 27 of the FIG. 1 embodiment. The control signals to open the gates of the elements in the DSP 20 are supplied to the internal data memory 32, the ALU 34, the accumulation unit 35 and the register 36. Also, the control signals are supplied to the selectors 40 and 41 to select signal lines from the register 36 and the accumulation unit 35, respectively. Therefore, the AGC multiplication factor h outputted from the accumulation unit 35 is inputted into the ALU 34 through the selector 41 and is concurrently inputted into the data memory 32, while the compensation value Y retrieved from the memory 32 is inputted into the ALU 34 through the register 36 and the selector 40 to thereby effect addition/subtraction. This operation is repeatedly carried out to update the AGC multiplication factor h.

The above described various processings are sequentially and repeatedly executed by desired program utilizing commonly the internal structure of the DSP, thereby producing an output signal stable at the level of the target value by eliminating level fluctuation from the input signal. The digital output signal may be converted into a corresponding analog signal through a D/A converter.

As described above, according to the invention, the input gain regulation is effected by the DSP programming, thereby advantageously eliminating a hardware structure for the regulation and facilitating change in operational parameters. Further, the output signal can be stabilized at the target energy value, while the AGC operation can quickly respond to an overall level shift of the input signal. Moreover, the processing time can be advantageously shortened.

What is claimed is:

1. An automatic gain control apparatus comprising:

multiplier means for multiplying an input signal by a given AGC multiplication factor to produce an output signal;

adder means for subtracting a target value from the output signal and adding an integrated value to the output signal to produce an error value;

integrator means for integrating the error value from the adder means to produce said integrated value;

operator means for computing a compensation value based on the error value according to a predetermined polynomial; and accumulator means for producing said AGC multiplication factor according to the compensation value, wherein the automatic gain control apparatus is composed of a digital signal processor specifically programmed to functionally constitute the multiplier means, the adder means, the operator means, and the accumulator means.

2. An automatic gain control apparatus according to claim 1, further including squaring multiplier means interconnected between the multiplier means and the adder means for squaring the output signal, and wherein the adder means includes means for subtracting the target value from the squared output signal and for adding the integrated value to the squared output signal.

3. An automatic gain control apparatus according to claim 1, wherein the adder means includes the integrator means for integrating the error value from the adder means.

4. An automatic gain control method utilizing a digital signal processor operated according to a specific program to effect automatic gain control of an audio input signal to stabilize an output signal at a predetermined target value, the method comprising:

receiving the audio input signal at an input of the digital signal processor;

operating the digital signal processor to multiply the audio input signal by a given AGC multiplication factor to produce the output signal;

operating the digital signal processor to subtract the target value from the output signal and adding an integrated value to the output signal to produce an error value;

operating the digital signal processor to integrate the error value to produce said integrated value;

operating the digital signal processor to compute a compensation value based on the error value according to a predetermined polynomial;

operating the digital signal processor to process the compensation value to thereby produce said AGC multiplication factor; and outputting the output signal at an output of the digital signal processor.

5. A method according to claim 4, further comprising the step of operating the digital signal processor to square the output signal before operating the digital signal processor to subtract the target value from the squared output signal and adding the integrated value to the squared output signal.

6. An automatic gain control apparatus comprising:

a multiplier circuit to multiply an input signal by a computed AGC multiplication factor to produce an output signal;

an adder circuit to subtract a target value from the output signal and add an integrated value to the output signal to produce an error value;

an integrator circuit to integrate the error value to produce said integrated value;

an operator circuit to compute a compensation value based on the error value according to a predetermined polynomial; and an accumulator circuit to compute said AGC multiplication factor according to the compensation value.

7. An apparatus according to claim 6, further including a squaring multiplier circuit coupled between the multiplier circuit and the adder circuit to square the output signal supplied to the adder circuit.

8. An apparatus according to claim 7, wherein the automatic gain control apparatus comprises a digital signal processor including circuit elements and specific programming to perform the operations of the multiplier circuit, the squared multiplier circuit, the adder circuit, the integrator circuit, the operator circuit, and the accumulator circuit.

* * * * *